Inventor
Richard R. Dimont
By Clarence A. O'Brien
Attorney

Jan. 28, 1941.    R. R. DIMONT    2,229,919
BRAKE ADJUSTER
Filed May 16, 1940    2 Sheets-Sheet 2

Inventor
Richard R. Dimont

By Clarence A. O'Brien

Attorney

Patented Jan. 28, 1941

2,229,919

UNITED STATES PATENT OFFICE 2,229,919

BRAKE ADJUSTER

Richard R. Dimont, Altamahaw, N. C.

Application May 16, 1940, Serial No. 335,607

2 Claims. (Cl. 188—79.5)

The present invention relates to new and useful improvements in hydraulic brake adjusters particularly for motor vehicles and has for its primary object to provide, in a manner as hereinafter set forth, novel means for automatically adjusting the shoes in a manner to compensate for wear as it occurs on the linings.

Another very important object of the invention is to provide an automatic brake adjuster of the aforementioned character comprising novel auxiliary means for securing the brakes in adjusted position in the event that the primary mechanism for performing this function should fail.

Other objects of the invention are to provide an automatic brake adjuster of the character described which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein.

Figure 1:
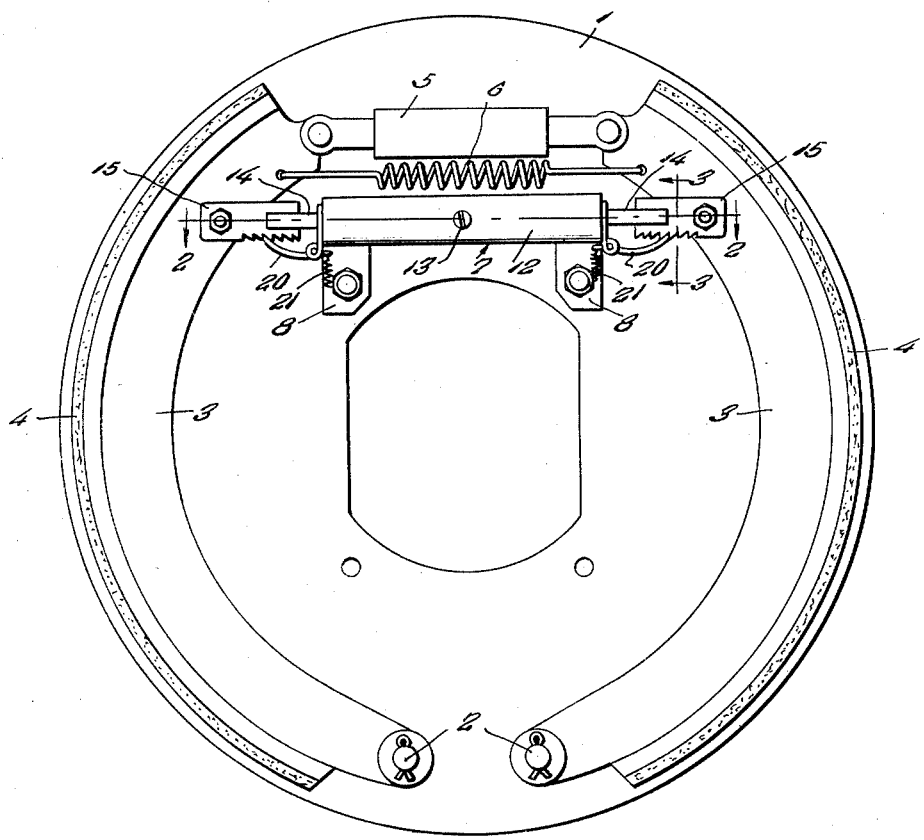
Figure 1 is a view in side elevation of a hydraulic brake equipped with an automatic adjuster constructed in accordance with the present invention.

Referring now to the drawings in detail, it will be seen that the reference numeral 1 designates the stationary back plate of a hydraulic vehicle brake. Pivotally mounted, as at 2, on the lower portion of the plate 1 is a pair of shoes 3. The faces of the shoes 3 are provided with the usual linings 4. The free upper ends of the shoes 3 are operatively connected to a conventional hydraulic operating mechanism 5. A return spring 6 retracts or releases the shoes 3.

The embodiment of the present invention which has been illustrated comprises a tubular housing 7 of suitable metal which is secured on the plate 1 in a horizontal position beneath the hydraulic cylinder 5. Any suitable means may be provided for attaching the housing 7 to the plate 1, such as brackets or ears 8. The tubular housing 7 is closed at its ends, as at 9, and is further provided, at longitudinally spaced points, with partitions 10. Further, spaced openings 11 are provided in the tubular housing 7. A single metallic closure 12 of arcuate cross section is provided for the openings 11, said closure being secured to the housing 7 by a screw 13.

Figure 6:
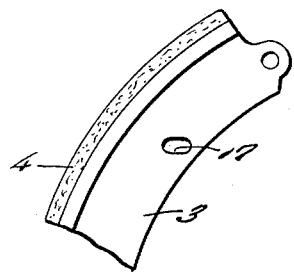
Figure 6 is a view in side elevation of an end portion of one of the brake shoes.
Figure 7:
Figure 7 is a detail view in perspective of one of the clutch members.
Figures 2, 3, 4, 5:
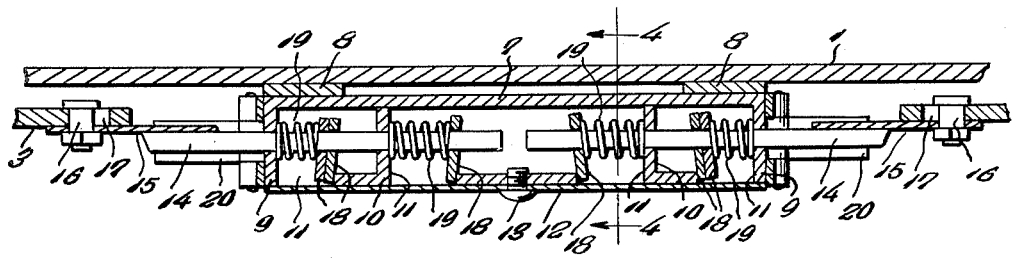
Figure 2 is a view in horizontal section, taken substantially on the line 2—2 of Fig. 1.
Figure 3 is a cross sectional view, taken substantially on the line 3—3 of Fig. 1.
Figure 4 is a cross sectional view through the device, taken substantially on the line 4—4 of Fig. 2.
Figure 5 is a detail view in perspective of one of the adjusting rods.

Mounted for longitudinal sliding adjustment in the tubular housing 7 and projecting from the ends thereof is a pair of rods 14. It will be observed that the rods 14 pass slidably through the end walls 9 and the partitions 10 of the tubular housing 7. Fixed on the outer end portions of the rods 14 are ratchet bars 15. Suitable pins or the like 16 pivotally connect the ratchet bars 15 to the shoes 3. As shown to advantage in Figs. 2 and 6 of the drawings, the openings 17 in the shoes 3 which accommodate the pivots 16 are in the form of slots allowing sufficient play to permit said shoes 3 to release.

Mounted on the rods 14 in the tubular housing 7 are clutch members 18 for securing said rods in adjusted position. One end portion of the clutch members 18 bears against the inner end walls of the openings 11 for "coking" said clutch members in a manner to frictionally grip the rods 14. The clutch members 18 are "cocked" in this manner through the medium of coil springs 19 mounted on the rods 14 and engaged with the end walls 9 and the partitions 10 of the tubular housing 7.

Pivotally mounted on the ends 9 of the tubular housing 7 are pawls 20 which are operatively engageable with the ratchet bars 15 for positively securing the rods 14 against retraction. Springs 21 are connected to the pivoted ends of the pawls 20 for yieldingly engaging said pawls with the ratchet bars 15.

It is thought that the operation of the device will be readily apparent from a consideration of the foregoing. The brakes are applied in the usual manner by the conventional means including the hydraulic cylinder 5, the openings or slots 17, as hereinbefore explained, permitting sufficient movement of the shoes 3, under ordinary conditions, without moving the rods 14. However, when sufficient wear on the linings 4 has occurred to necessitate movement of the shoes 3 beyond the distance allowed by the slots 17, the rods 14 are pulled outwardly by said shoes and retained against inward movement by the friction clutch members 18. Thus, the shoes 3 are automatically adjusted to compensate for wear. The pawls 20 will positively secure the brakes in adjusted position should the friction clutch members 18 fail for any reason such, for example, as oil or grease getting on the rods 14.

It is believed that the many advantages of an automatic brake adjuster constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. In a vehicle brake including a back plate and shoes pivotally mounted thereon, an adjuster comprising a substantially tubular housing mounted horizontally on the back plate between the shoes, rods mounted for longitudinal sliding adjustment in the housing and projecting from the ends thereof, ratchet bars mounted on the outer end portions of the rods and pivotally connected to the shoes, and spring pressed pawls pivotally mounted on the end portions of the housing and engageable with said ratchet bars for securing the rods against inward sliding movement.

2. In a brake comprising a back plate and shoes pivotally mounted thereon, an adjuster including a substantially tubular housing mounted horizontally on the back plate between the shoes, rods mounted for longitudinal sliding movement in the housing and projecting from the ends thereof, ratchet bars fixed on the outer end portions of the rods and pivotally connected to the shoes, clutch members mounted on the rods in the housing for frictionally securing said rods against inward sliding movement, coil springs mounted on the rods and engaged with the clutch members for binding said clutch members on said rods, and spring pressed pawls pivotally mounted on the end portions of the housing and engaged with the ratchet bars for positively securing the rods against inward sliding movement in the event of failure of the clutch members.

RICHARD R. DIMONT.